United States Patent [19]
Hooven

[11] 3,861,015
[45] Jan. 21, 1975

[54] WIRE HARNESS CLIP

[75] Inventor: Frederick Hooven, Radnor, Pa.

[73] Assignee: Gudebrod Bros. Silk Co., Inc., Philadelphia, Pa.

[22] Filed: June 4, 1973

[21] Appl. No.: 366,735

[52] U.S. Cl. ....... 29/203 MW, 24/81 CR, 174/72 A, 248/68 R, 248/70, 248/74 A, 317/122
[51] Int. Cl. ............................................. H02b 9/00
[58] Field of Search.......... 248/68 R, 73, 74 A, 295, 248/296, 59, 65, 70, 74 PB, 74 B, 361 B, 50, 71; 174/72 A, 40 CC; 269/43, 254 R, 321 WE, 321 A; 29/203 MW; 24/81 CR, 81 CC, 81 B, 73 B, 73 SA, 115 G, 129 B, 243 Q, 243 CR; 317/122

[56] References Cited
UNITED STATES PATENTS

| | | | |
|---|---|---|---|
| 1,206,203 | 11/1916 | Brockway | 248/295 X |
| 1,260,206 | 3/1918 | Kent | 248/296 X |
| 1,505,220 | 8/1924 | Shay | 248/316 D |
| 1,837,701 | 12/1931 | Buyken et al. | 248/50 |
| 2,382,428 | 8/1945 | Leuvelink | 248/361 B |
| 2,461,198 | 2/1949 | Chiger | 248/361 B X |
| 2,961,479 | 11/1960 | Bertling | 248/316 D X |
| 3,154,276 | 10/1964 | Havener | 24/73 B X |
| 3,363,864 | 1/1968 | Olgreen | 248/74 A X |
| 3,409,971 | 11/1968 | Morrow | 174/72 A |
| 3,531,090 | 9/1970 | Laible | 24/243 Q X |

FOREIGN PATENTS OR APPLICATIONS

| | | | |
|---|---|---|---|
| 751,600 | 1/1967 | Canada | 24/115 G |
| 576,249 | 5/1959 | Canada | 248/74 PB |
| 52,701 | 12/1966 | Germany | 174/72 A |

*Primary Examiner*—James T. McCall
*Assistant Examiner*—Rodney H. Bonck
*Attorney, Agent, or Firm*—John W. Logan, Jr.

[57] ABSTRACT

A wire harness clip capable of being removably secured to harness pins on a wire harness board is described with the clip consisting of an elongated flat body portion that may be supported in any desired plane parallel to the surface of the harness board and having an integral resilient arcuate shaped locking portion extending from one end of the flat body portion adapted to removably secure the clip to a pin extending perpendicular to the harness board. A series of fastening means are provided along the length of the body portion to engage and hold the wires of the wire harness in the desired position prior to the tying operation.

3 Claims, 8 Drawing Figures

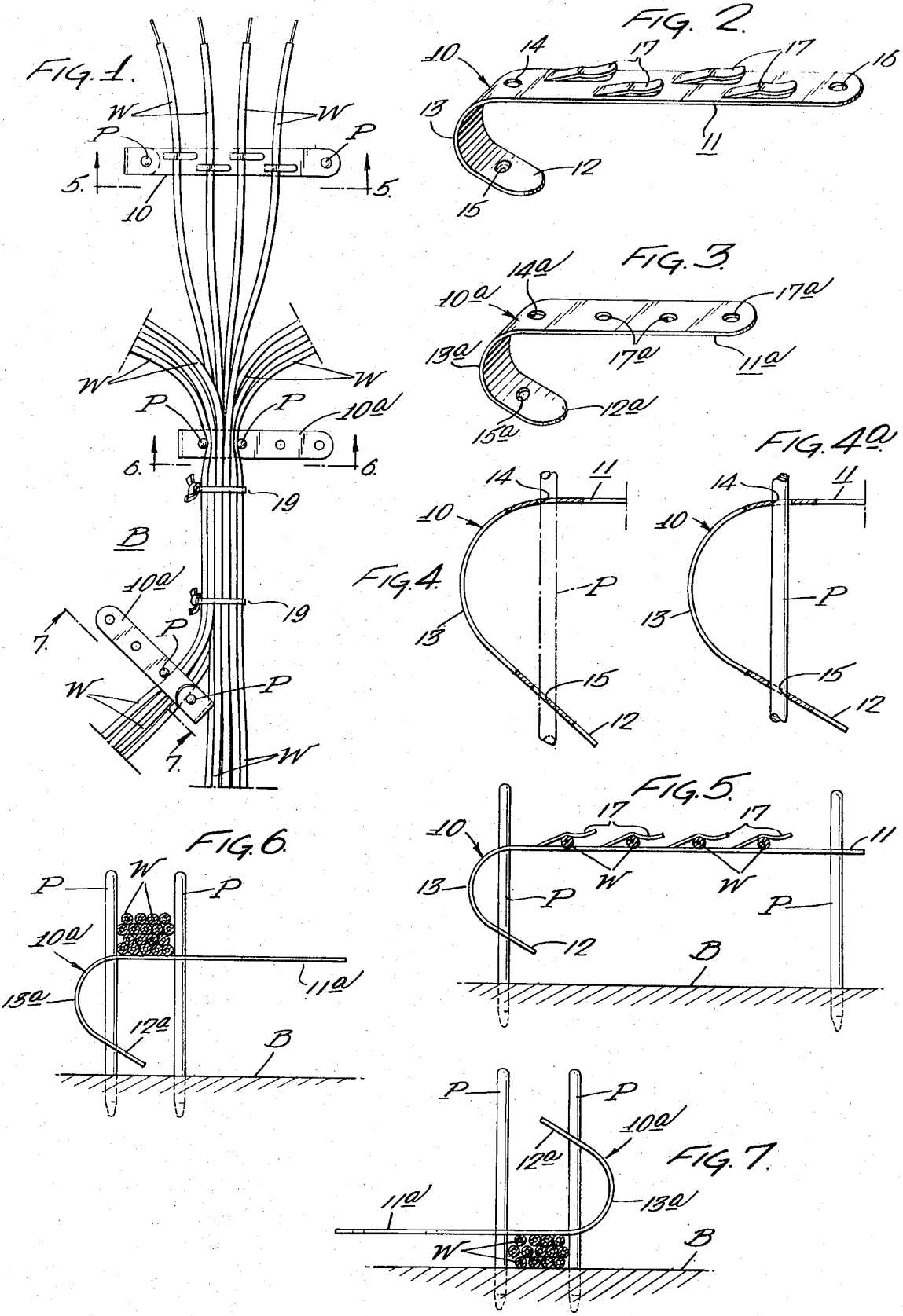

WIRE HARNESS CLIP

The present invention relates to new and useful improvement in clip members for holding wire of a wire harness in place during formation of the harness.

In the conventional procedure for making a wire harness, a flat board is used on which is drawn a diagram of the desired wire harness. Pins are driven into the board at desired locations and the wires are guided about the pins to locate the wires in the desired position. Thereafter the wires are tied together with lacing tape to complete the formation of the wire harness. The harness is then lifted off of the board and the board is ready for the beginning of the formation of a second similar harness. In many types of wire harnesses it is desirable to individually support wire ends under tension at specific locations and to hold groups of wires together either against the surface of the board or spaced from the board for a later tying operation.

With the foregoing in mind a primary object of the present invention is to provide a novel clip member which can be used in all phases of wire harness formation to support, position and hold wires prior to tying.

Another object of the present invention is to provide a novel universal clip for use in forming wire harnesses which can be readily secured to standard wire harness pins and just as easily removed from the pins after completion of the wire harness.

A further object of the present invention is to provide a novel wire harness clip which can be quickly applied to the pins on the harness board by the user in a simple one-handed operation and which will help to make the formation of the wire harness easier and quicker.

A still further object of the present invention is to provide a novel wire harness clip having the features and characteristics set forth above which can be made inexpensively from a single piece of material and which is highly efficient and effective in operation and use.

These and other objects of the present invention and the various features and details of construction and use thereof are hereinafter more fully set forth and described with reference to the accompanying drawings in which:

FIG. 1 illustrates a portion of a formed and partially tied wire harness showing the use of clips of the present invention;

FIG. 2 is a perspective view of a wire harness clip made in accordance with the present invention;

FIG. 3 is a perspective view of a clip similar to FIG. 2 with a different means provided on the body portion of the clip to guide and support the wires;

FIG. 4 is an enlarged fragmentary sectional view of the locking end of the clip in its relaxed position prior to being applied to a wire harness pin;

FIG. 4a is a view similar to FIG. 4 with the locking end of the clip applied to a wire harness pin;

FIG. 5 is a transverse sectional view taken along line 5—5, FIG. 1, illustrating the clip of FIG. 2 in use supporting the individual ends of wires in the wire harness;

FIG. 6 is a transverse sectional view taken along lines 6—6, FIG. 1, illustrating one form of use of the clip of FIG. 3; and FIG. 7 is a transverse sectional view taken along lines 7—7, FIG. 1, illustrating another form of use of the clip of FIG. 3.

Referring more specifically to the drawings and particularly FIG. 1, there was illustrated a portion of a wire harness composed of a plurality of individual wires "W" guided by harness pins "P", extending perpendicular to the surface of a harness board "B". In order to grip terminal ends of the wires and hold and support bundles of wire at desired locations a series of wire harness clips made in accordance with the present invention are secured to selected wire harness pins.

FIG. 2 illustrates one form of a wire harness clip 10 of the present invention. This clip 10 includes a flat planar upper body portion 11 and a flat planar lower terminal end portion 12 extending at an acute angle to the body portion and connected to the body portion by an intermediate arcuate locking portion 13. The clip 10 preferably is formed from a flat strip of tempered spring metal so that the terminal end portion 12 may be spring biased manually toward the body portion, but will return to its original position extending at an acute angle to the body portion when pressure on the terminal end portion is released.

In accordance with the present invention, means is provided to permit the clip to be securely locked into position onto a pin "P" at any desired location along the length of the pin with the body portion 11 of the clip extending at right angles to the pin and lying parallel to the plane of the harness board. To accomplish this a first locking hole 14 is provided at the inner end of the body portion 11 and a second locking hole 15 is provided at the end of the flat terminal end portion 12 adjacent the intermediate arcuate locking portion 13. These two openings 14 and 15 should have a diameter slightly greater than the external diameter of the harness pin to which the clip is to be attached so that they may slip freely over the pin when their axes are substantially coextensive with the axis of the harness pin. In the relaxed position of the clip the longitudinal axis of the opening 14 and the longitudinal axis of the opening 15 extend at an angle to one another and intersect at a point intermediate the body portion 11 and the terminal end portion 12 of the clip, for example, as shown in FIG. 2. When pressure is applied to the body portion and terminal end portion to bend these portions toward one another the openings 14 and 15 are brought into substantial alignment to permit the clip to be easily slipped over a pin with the pin extending through both of the openings 14 and 15, and to permit the clip to be easily moved longitudinally of the pin. Upon release of pressure on the body portion and terminal end portion of the clip the locking end of the clip assumes the position, for example, as shown in FIG. 4a, in which the sides of the openings 14 and 15 are forced against the harness pin by a spring tension of the arcuate locking portion of the clip to securely maintain the clip in a preselected position on the pin. Similarly, when it is desired to remove the clip from the pin, pressure may be applied to the body portion 11 and terminal end portion 12 of the clip, squeezing them together to again bring the axes of the openings 14 and 15 into substantial alignment and permit the clip to be easily slid off of the pin.

If desired, an opening 16 may be provided in the extreme outer end portion of the body portion 11 of the clip of FIG. 2 to permit placement of a second harness pin through this opening and into the surface of the board and prevent movement of the clip about the axis of the harness pin passing through the openings 14 and 15.

The body portion 11 of the clip 10 includes a series of clamping means to engage individual wires of the wire harness and hold these wires in position under tension during formation of the wire harness. This clamping means may consist of individual fingers 17 stamped out of the body portion 11 of the clip at uniformly spaced locations along the length of the body portion 11. Preferably, the fingers extend in a direction lengthwise of the body portion of the clip with adjacent fingers being staggered alternately along the clip as shown in FIG. 2. The finger 17 should be bent slightly upwardly from the top surface of the body portion 11 to a high point at the middle of the finger and terminate in a slightly convex end portion to permit individual wires to be easily inserted between the lower surface of the finger and the upper surface of the body portion 11. The spring tension of the fingers will hold the wire ends under tension during further formation of the wire harness. After the harness is completed the wire ends may be readily pulled out of engagement with these fingers.

FIG. 3 illustrates a modified form of the clip of the present invention specifically designed to hold groups or bundles of wires together in a predetermined position relative to the surface of the wire harness board during formation of the wire harness. The clip 10a of FIG. 3 includes a body portion 11a, a terminal end portion 12a, and an intermediate arcuate locking portion 13a, formed similar to those of the clip of FIG. 2 with a pair of locking holes 14a and 15a similar to the locking holes 14 and 15 of FIG. 2. Positioned lengthwise of the body portion 11a of this clip is a series of openings 17a having a diameter slightly larger than that of the wire harness pins so that after the clip is locked onto its supporting harness pin, additional pins may be placed through the openings 17a and into the surface of the wire harness board. This clip 10a may be used either in the position as shown in FIG. 6 with the body portion 11a facing upwardly to provide a platform of limited extent between two adjacent pins adapted to hold a bundle of wires above the surface of the wire harness board, or may be used in the upside-down position as shown in FIG. 7 to hold a bundle of wires previously placed between adjacent pins tightly down against the surface of the wire harness board.

After all of the wires of the wire harness are in position and maintained in position by the clips 10 and 10a, lacing tape 19 may be tied about the wire harness at the desired locations and the completed wire harness may be easily and quickly removed from the board by first removing the clips utilized as shown in FIG. 7, and thereafter lifting the wire harness upwardly out of engagement with the wire harness pins.

From the foregoing, it will be seen that the present invention provides a novel, inexpensive wire harness clip which can be used in all phases of wire harness formation to support, position and hold wires of the wire harness in position prior to the tying operation.

While particular embodiments of the present invention have been illustrated and described herein, it is not intended to limit the invention to such a disclosure, and changes and modifications may be incorporated and embodied therein within the scope of the following claims:

I claim:
1. Apparatus for use in the formation of wire harnesses comprising:
   a harness board having a flat working surface;
   at least one harness pin secured to said harness board and extending perpendicularly upward from the working surface of the harness board;
   at least one wire harness clip removably secured to said harness pin to support the wires of said harness in a predetermined position relative to the working surface of said harness board with the wires of said harness extending generally parallel to the working surface of the board, said clip comprising a planar body portion having a free outer end and an inner end portion, means defining a first opening at said inner end portion of said body portion of a diameter slightly greater than the external diameter of the harness pin, said inner end portion integrally connected to a resilient and generally arcuate shaped locking portion, said arcuate locking portion terminating in a generally flat planar terminal end portion diverging from said body portion at an acute angle, means defining a second opening at said flat terminal end portion of a diameter substantially equal to the diameter of said first opening, the axes of said first and second opening intersecting at a point intermediate said body and terminal end portions, said arcuate locking portion adapted to be flexed under pressure by moving said terminal end portion toward said body portion to bring the axes of said first and second openings into substantial alignment and permit both said openings to engage over a harness pin and lock said clip to said harness pin upon release of pressure on said body and terminal end portions, the body portion of said clip extending in a direction normal to the axis of the harness pin to which said clip is attached to provide a flat wire support extending parallel to and spaced above the working surface of the harness board;
   and means at spaced locations along said body portion of said clip to hold wire of said wire harness in the desired position.

2. Apparatus in accordance with claim 1 wherein the means to hold wires on said body portion comprises a plurality of resilient finger portions formed integrally with said body portion and extending generally parallel to and above the plane of said body portion, each finger portion operable to resiliently grip and hold a portion of a wire.

3. Apparatus in accordance with claim 1 wherein the means to hold the wires on said body portion comprises a series of uniformly spaced openings along said body portion and at least one additional harness pin extending upwardly from the surface of the board and engaged within one of said spaced openings to hold a plurality of wires of the wire harness between the additional harness pin and the harness pin passing through said first and second openings.

* * * * *